A. LARSEN.
RIVETING MACHINE.
APPLICATION FILED OCT. 17, 1913.
1,156,013.
Patented Oct. 5, 1915.
7 SHEETS—SHEET 1.
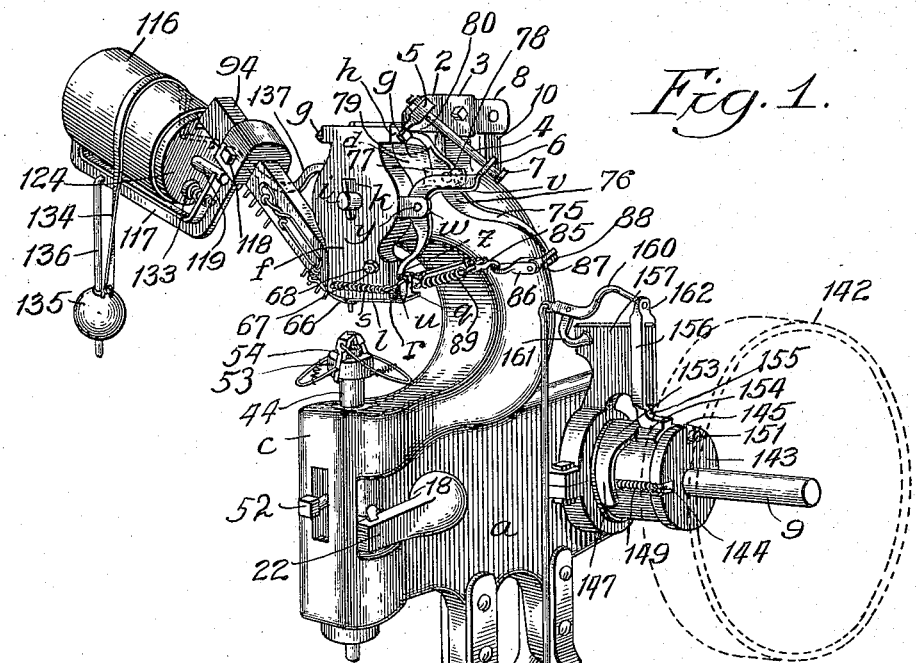
Fig. 1.
Fig. 2.
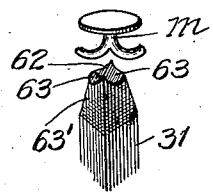
Fig. 3.
Fig. 4.
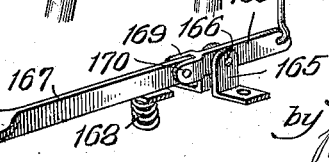
Witnesses:
John Enders
M. D. Hirman
Inventor:
Andru Larsen,
by Poole & Cromer
Attys.

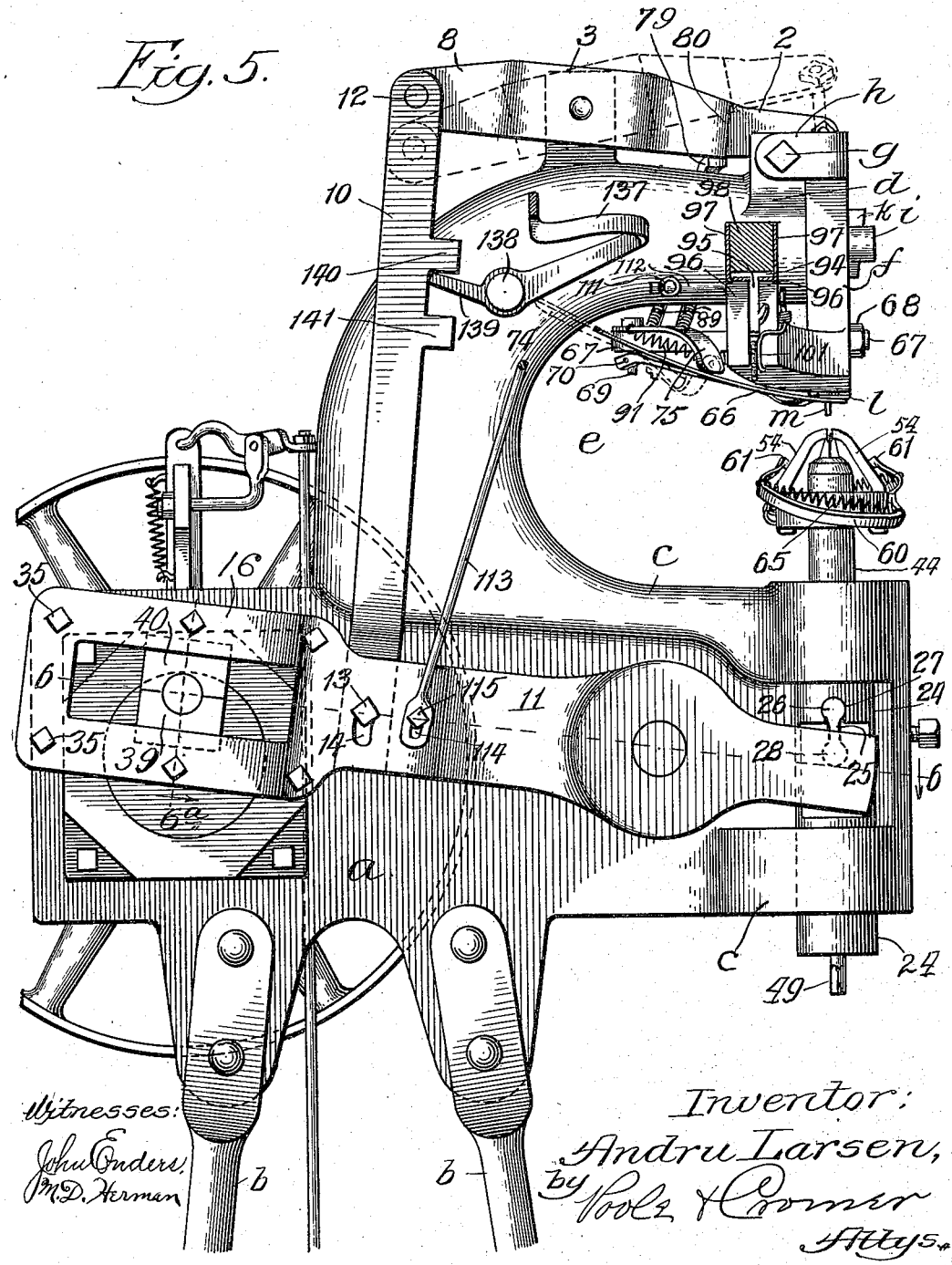

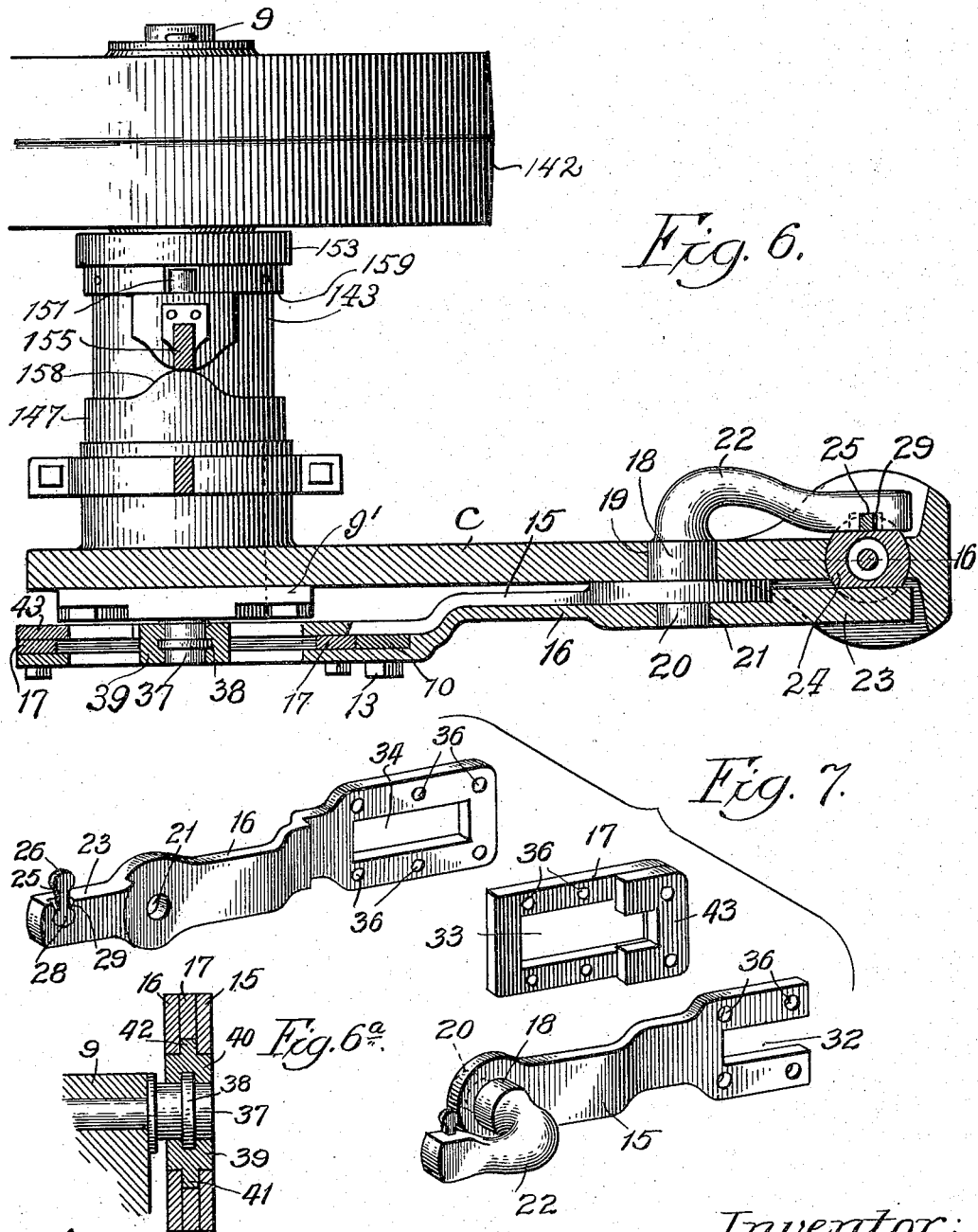

A. LARSEN.
RIVETING MACHINE.
APPLICATION FILED OCT. 17, 1913.
1,156,013.
Patented Oct. 5, 1915.
7 SHEETS—SHEET 4.
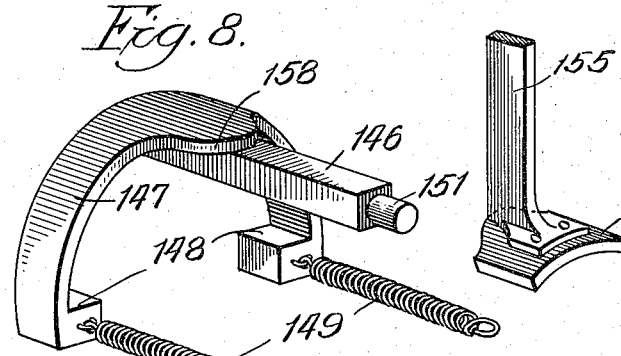
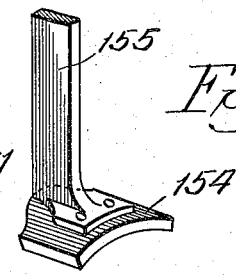
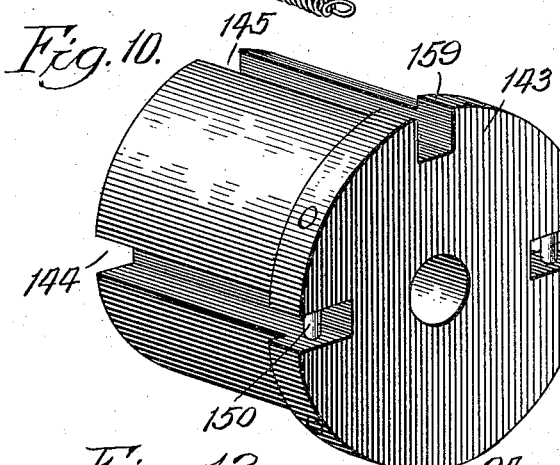
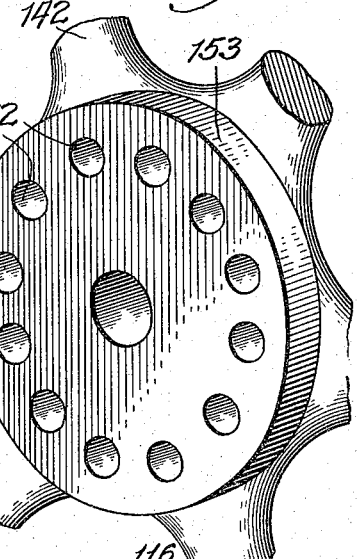
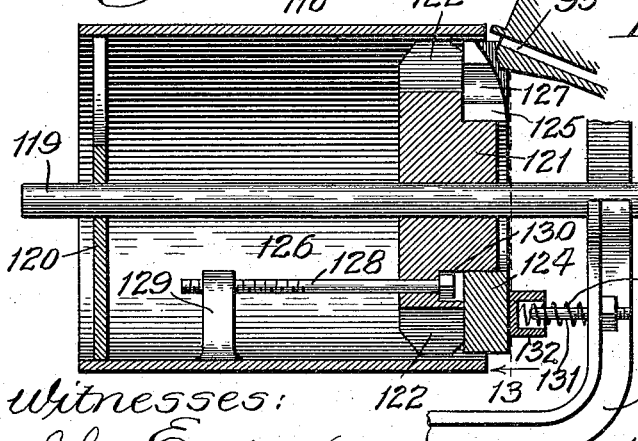
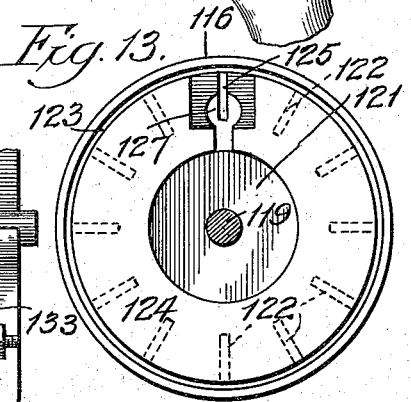

A. LARSEN.
RIVETING MACHINE.
APPLICATION FILED OCT. 17, 1913.

1,156,013.

Patented Oct. 5, 1915.
7 SHEETS—SHEET 5.

Witnesses:
John Enders
M. D. Herman

Inventor:
Andru Larsen,
by Poole & Cromer.
Attys.

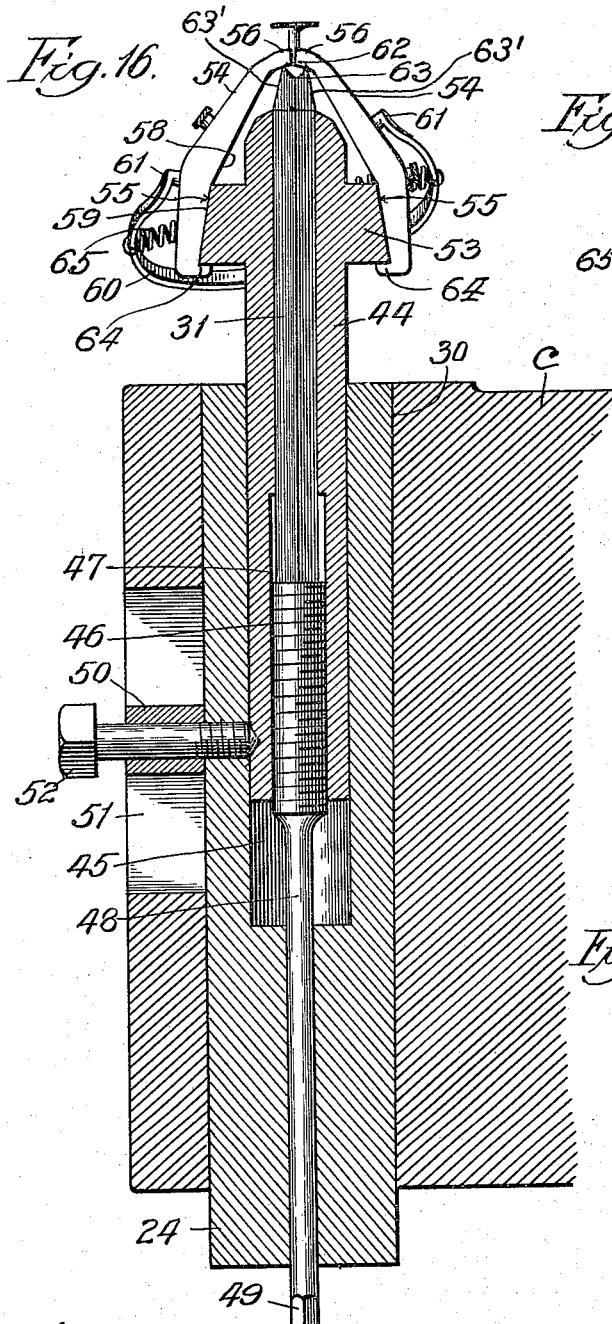

A. LARSEN.
RIVETING MACHINE.
APPLICATION FILED OCT. 17, 1913.
1,156,013.
Patented Oct. 5, 1915.
7 SHEETS—SHEET 7.
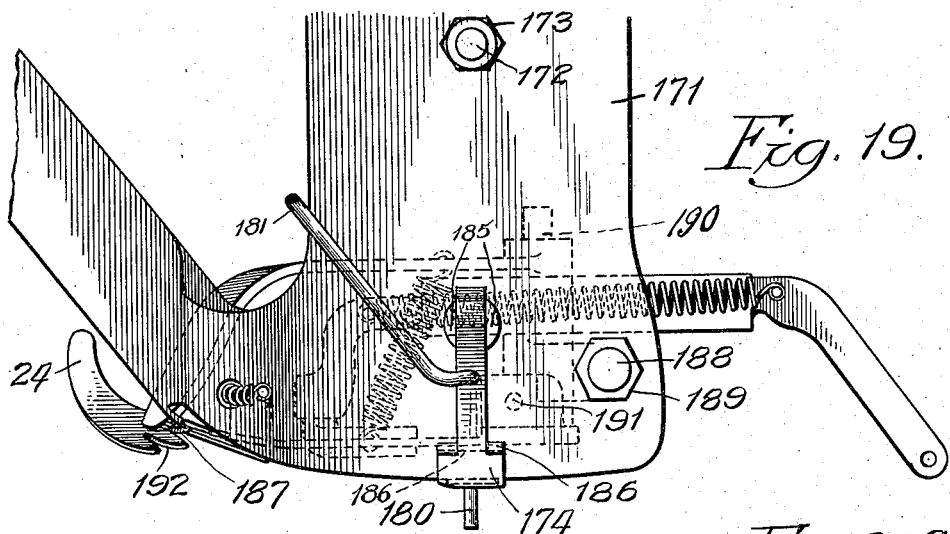
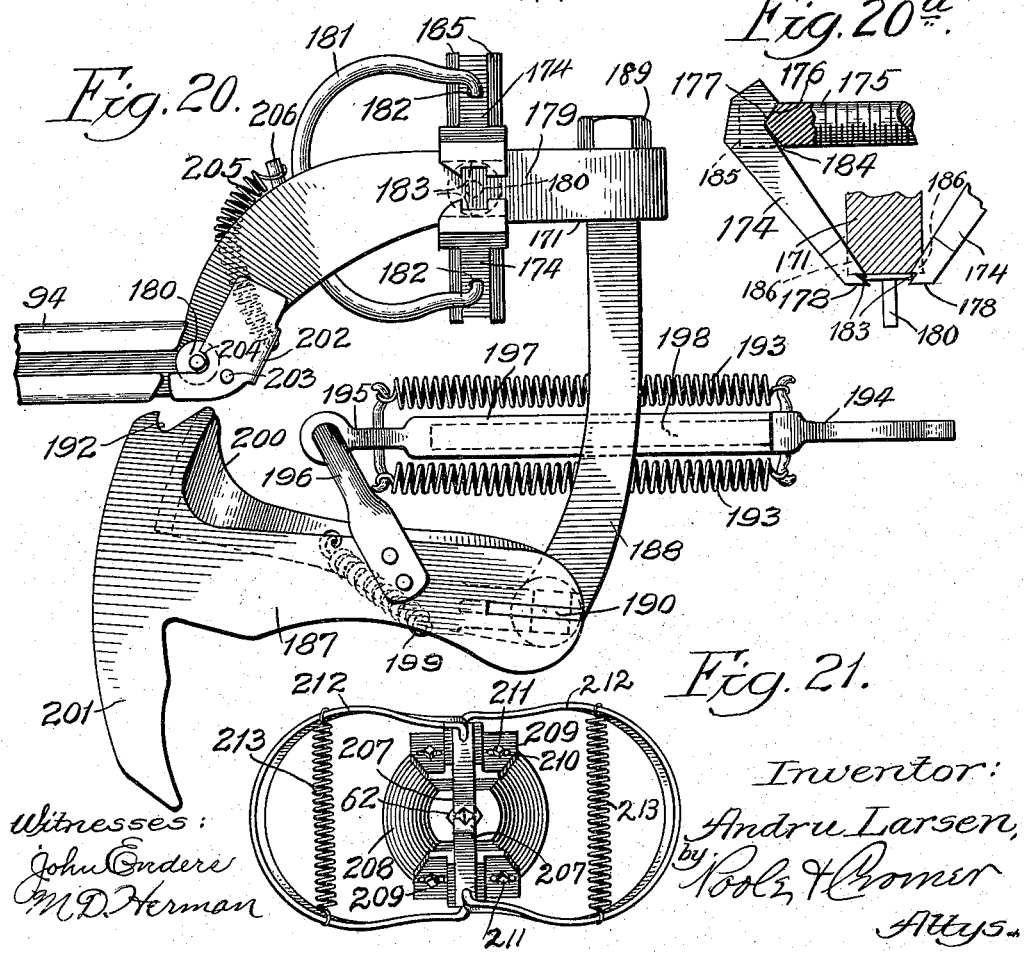

UNITED STATES PATENT OFFICE.

ANDRU LARSEN, OF CHICAGO, ILLINOIS.

RIVETING-MACHINE.

1,156,013.   Specification of Letters Patent.   Patented Oct. 5, 1915.

Application filed October 17, 1913. Serial No. 795,634.

*To all whom it may concern:*

Be it known that I, ANDRU LARSEN, a citizen of the United States, and a resident of Chicago, in the county of Cook and State of Illinois, have invented certain new and useful Improvements in Riveting-Machines; and I do hereby declare that the following is a full, clear, and exact description thereof, reference being had to the accompanying drawings, and to the letters of reference marked thereon, which form a part of this specification.

This invention relates to that class of riveting machines adapted to enable rivets to be inserted through the material to be operated upon or riveted and to be split and clenched in securing engagement with the material to be riveted.

The principal object of the invention is to provide a simple, economical and efficient riveting machine.

Other and further objects of the invention will appear from an examination of the description and claims and from an inspection of the accompanying drawings which are made a part hereof.

In the art to which this invention relates it is particularly desirable to provide a machine adapted to enable rivets to be inserted through material to be operated upon or riveted and to enable rivets so inserted to be split and clenched in binding engagement with the material to be operated upon or riveted, by a single or continuous operation of the machine, or by means of an organized mechanism adapted to insert, split and clench metallic rivets. It is also desirable to provide means for automatically feeding rivets successively into and supporting them in position to be inserted into the material to be riveted or operated upon or into position to be split and clenched in engagement with the material to be riveted, and to provide means for splitting and clenching rivets while in proper position in the material to be riveted or operated upon.

The invention consists in the features, combinations, and details of construction herein described and claimed.

Figure 14:
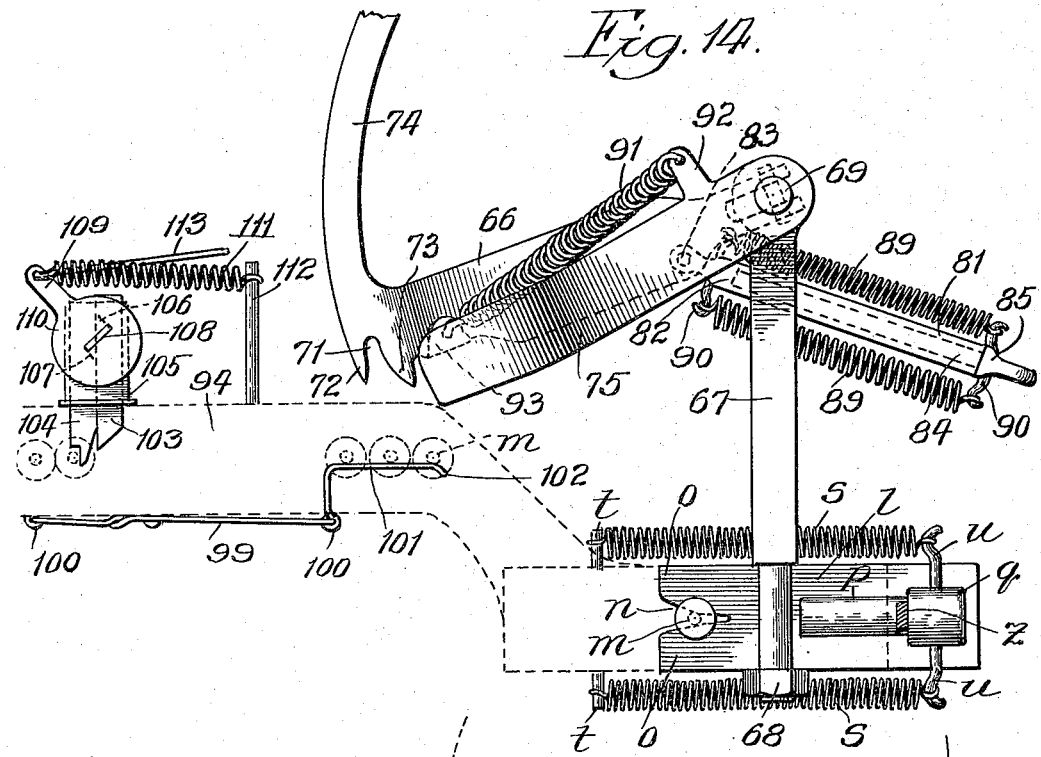
Figure 15:
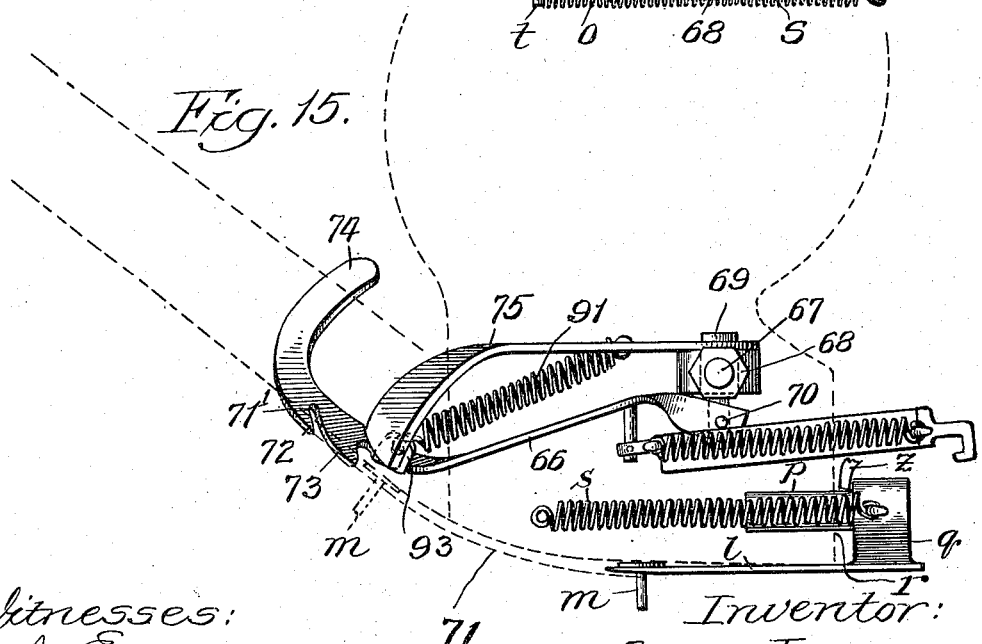

In the accompanying drawings, Figure 1 is a perspective view of a riveting machine constructed in accordance with my invention and improvements, all of the parts being shown in normal or initial position; Fig. 2, a perspective view of an ordinary metallic rivet adapted to be split and clenched in engagement with material to be operated upon or riveted, by means of a machine constructed in accordance with my invention; Fig. 3 a similar view of a rivet as it would appear after being split and clenched by my improved riveting machine; Fig. 4, a sectional view of an article, such as a hoof pad, comprising a plurality of layers of material, showing the same secured together by means of a rivet inserted, split and clenched by my improved riveting machine; Fig. 5, a view in side elevation of the upper portion of the machine shown in Fig. 1 as it would appear when viewed from the left side of Fig. 1, with certain parts removed for the purpose of more clearly illustrating the parts shown in said figure—all of the parts shown in said figure being in initial or normal position corresponding with the position of the parts shown in Fig. 1; Fig. 6, a horizontal sectional view in detail, taken on line 6—6 of Fig. 5, showing the main reciprocating or plunger-operating lever in longitudinal section, and showing the clutch upon the main driving shaft or crank shaft, in plan view; Fig. 6ª, a detail view in vertical section, taken on line 6ª of Fig. 5 looking in the direction of the arrow, and showing the two-part bearing block upon the crank pin of the main driving shaft and the main operating lever or plunger-operating member in vertical section; Fig. 7, a perspective view of the three principal parts or members which form the main reciprocating lever or plunger-operating member shown in Figs. 5 and 6, said members being shown separate but arranged in the same consecutive order in which they are secured together and mounted in operative position; Fig. 8, a perspective view in detail of the outer sliding member or cam member of the clutch shown in Figs. 1 and 6; Fig. 9, an enlarged detail view of the tripping member or shoe adapted to be moved into and out of operative engagement with the cam or sliding clutch shown in Fig. 8, in order to enable the clutch to be thrown into and out of clutching and releasing positions; Fig. 10, a perspective view of the peripherally slotted, cylindrical clutch member which is fixed to the main driving or crank shaft and shown in Fig. 1; Fig. 11, a perspective view of the hub of the driving pulley which is loosely supported upon the main driving shaft adjacent to the clutch and adapted to be engaged and released by the clutch; Fig. 12, a central longitudinal sectional view of the rotary rivet receptacle for containing the supply of rivets and enabling rivets to be automatically fed therefrom into position to be operated upon, and which receptacle is shown in operative position in Fig. 1; Fig. 13, a view in cross-section, taken on line 13 of Fig. 12, and showing an end view of the rivet receptacle shown in Fig. 12; Fig. 14, an enlarged plan view in detail, showing the reciprocating pivoted rivet-feeding mechanism shown in Figs. 1 and 5, said mechanism being shown in retracted position which it would occupy with the plunger or rivet-splitting cutter in rivet-engaging position after the upward movement of the plunger from the position in which it is shown in Figs. 1 and 5 into position to engage the bottom end of a rivet held in position to be inserted into the material to be operated upon or riveted, and also showing in dotted lines a rivet in position to be engaged by the next feeding movement of the reciprocating pivoted rivet-feeding arm or member, and the means for automatically regulating the supply of rivets passing through the inclined rivet-feeding chute or passage from the rivet receptacle to said pivoted rivet-feeding member; Fig. 15, a detail view in front elevation of the parts shown in Fig. 14; Fig. 16, an enlarged detail view in vertical section of the plunger for splitting and clenching the rivets, showing the yielding rivet-engaging or guide arms of the plunger head in engagement with a rivet, and the rivet-splitting and clenching tool or cutter also in engagement with the bottom end of the rivet. Fig. 17, a similar view of the upper portion of the plunger and its support shown in Fig. 16—the yielding rivet-engaging arms of the plunger head being shown in contact with the material through which the rivet extends, and with the cutter extending between said arms at the upward extremity of its movement, and as it would appear upon the completion of the splitting and clenching of the rivet; Fig. 18, a plan or end view of the plunger and cutter mechanism shown in Figs. 16 and 17; Fig. 19, a detail view in front elevation of a modified form of the rivet-feeding and supporting mechanism and upper jaw or head; Fig. 20, a bottom view of the feeding mechanism and upper jaw or head shown in Fig. 19, showing the reciprocating pivoted rivet-feeding arm and rivet-holding members in a position corresponding to a position in which the corresponding members are shown in Fig. 14; Fig. 20$^a$, a detail view of one of the rivet-holding arms shown in Figs. 19 and 20; and Fig. 21, a plan view of a modified form of cutting tool, plunger head and yielding rivet-engaging arms similar to the parts shown in Fig. 18 but with the yielding rivet-engaging arms mounted in adjustable supporting members which are adjustably secured to the plunger head.

In making a riveting, splitting and clenching machine in accordance with my invention and improvements, I provide a main frame $a$ which is mounted upon a suitable support or base such as legs $b$ and has a lower jaw $c$ and an upper jaw $d$ provided with a space $e$ therebetween adapted to enable material to be operated upon to be inserted between the jaws and to permit the rivet-feeding mechanism and the rivet-splitting and clenching tool or plunger and cutter to operate in an efficient manner.

The upper jaw or rigid head portion $d$ of the main frame is provided with a head $f$ adjustably secured thereto by means of a pair of transverse bolts $g$ which extend through suitable apertures in horizontal, rearwardly projecting side arm portions or lugs $h$ of the adjustable head member and into abutting engagement with the main frame or rigid upper jaw portion $d$ located between the lugs $h$, as indicated in Fig. 5, and a horizontal stud or pin $i$ anchored in or formed integral with the rigid upper jaw or main frame portion $d$ extends through the central perforated portion of the adjustable head or member $f$ and is adapted to secure the latter in any position to which it is adjusted. A wedge $k$ is inserted through the pin $i$ and in wedging engagement with the adjustable head or jaw member $f$. The head is thus adapted to be adjusted transversely of the rigid jaw portion $d$ by the turning of either of the bolts $g$ in the required direction to loosen it and simultaneously or immediately afterward turning the opposite bolt $g$ in the required direction to tighten it, and then tightening the wedge $k$, thereby securing the head or jaw member $f$ in the desired relation to the splitting and clenching tool or cutter and plunger supported by the lower jaw $c$. (See Fig. 1.)

A rivet-supporting plate, arm or slide $l$, shown in Figs. 5, 14 and 15, is slidably mounted upon the adjustable head or upper jaw member $f$ in position to support a rivet $m$ in upright position with the head of the rivet in engagement with the flat bottom surface of the rigid head or jaw member $f$ and with the shank or body of the rivet held by the plate or slide $l$ in position to extend downward through a tapered slot or notch $n$ between the forked end portions or tapered rivet-supporting side fingers $o$ of the plate or slide *l*. This plate or rivet-supporting member *l* is slidably mounted in the upper jaw or head by means of a guiding pin or arm *p* secured to one end of the plate or rivet-supporting member *l* by means of an upwardly projecting boss *q* fixed to or forming an integral part of the plate and to which the forward end of the pin *p* is, by preference, secured in fixed parallel relation to the plate. The pin *p* extends horizontally transversely of the head and into a transverse horizontal socket *r* in the upper head or jaw member *f*, (see Figs. 1 and 14,) and is thus adapted to slide in the socket transversely of the head or upper jaw member and to support the plate *l* which moves with it into and out of position to engage and hold a rivet in position to be operated upon. (See Fig. 1.) The rivet-supporting member or sliding plate *l* is yieldingly held in operative position by means of springs *s*, the inner ends of which are secured to the rigid upper jaw member by means of lugs or bosses *t*, or other suitable, ordinary and well known securing means, and the outer ends of which are secured to the slide or rivet-supporting member *l* by means of hooks or arms *u* on the projection or boss *q* adapted to form a connection between the springs *s* and the forward end of the plate or rivet-supporting slide. (See Figs. 1 and 14.)

A bell crank lever *v* is pivotally supported upon the head member *f* by means of lugs *w* upon said head member and a pivot *y* supported by the lugs and extending through and forming a pivotal support for said lever. The bottom end or arm *z* of the lever *v* extends downward into operative engagement with the inner side of the boss *q* on the rivet holder or slide *l*, and is adapted to move the slide outward against the tension of the springs *s*, said springs being adapted to move the slide in the opposite direction and into the rivet-supporting or operative position shown in Figs. 14 and 15, when the lever *v* is released so as to permit such movement. The lever *v* is operatively connected with the forward arm 2 of an auxiliary feed lever 3 by means of a connecting link or rod 4, the upper end of said link or rod being connected with the lever arm 2 by means of a lug 5 on said lever arm and the lower end of the link or connecting rod being loosely mounted in a socket portion 6 of the bell crank lever *v* and being provided with a head 7 adapted to permit a limited movement of the link and of the auxiliary feed lever 3 in an upward direction before causing the bell crank lever *v* to be operated and the slide *l* to be withdrawn from rivet-holding position. (See Fig. 1.)

The rear arm 8 of the auxiliary feed lever 3 is operatively connected with a main drive or crank shaft 9 by means of a connecting rod or pitman 10 and a main operating lever 11, the upper end of the connecting rod or pitman 10 being pivotally connected with the rear arm 8 of the auxiliary lever 3 by means of a pivot 12, and the lower end of said connecting rod being connected with the main operating lever 11 by means of a bolt or pivot pin 13 anchored in the main operating lever and extending through a vertically elongated slot 14 in the connecting rod or pitman adapted to permit a limited extent of lost motion between the auxiliary feed lever 3 or connecting rod 10 and the main operating lever 11. (See Fig. 5.)

The main operating lever 11 comprises in its construction three principal members, 15, 16 and 17, shown separately in Fig. 7 and shown secured together in Figs. 6 and 6ª. The lever member 15 is provided with a transverse pivot portion or bearing member 18 which extends through a suitable aperture or bearing 19 in the lower jaw of the stationary main frame, as indicated in Fig. 6, and has a transversely projecting stud or boss 20 which is, by preference, formed in one integral piece with the transverse pivot or bearing member 18 and adapted to extend into an aperture 21 in the lever member 16 so as to connect the lever members 15 and 16. A separate bolt or transverse pivot is thus dispensed with. (See Figs. 6 and 7.) A forwardly projecting arm portion 22, which is by preference integral with the transverse bearing portion 18 and stud 20 and forms an arm portion of the member 15, already described, extends forward of the pivotal point or transverse pivot portion 18 on one side of the lower jaw *c* of the main frame, as indicated in Figs. 1 and 6, and an arm portion 23 integral with the member 16 extends forward of the aperture 21 in said member 16 and forward with respect to the transverse pivot or bearing portion 18, and is located on the opposite side of the lower jaw of the main frame from the arm 22. The arms 22 and 23 thus form a forked end portion of the main operating lever 11, adapted to support therebetween and operate a plunger 24 and rivet-splitting and clenching tool or cutter, as hereinafter more particularly described.

The members 15, 16 and 17 which form the main operating lever 11 are provided with longitudinally elongated recesses 32, 33 and 34, as shown in Fig. 7, and are secured together in the order in which they appear in Fig. 7, by means of bolts or screws 35 which extend through the corresponding apertures 36 in said members, which being thus secured together form the rear arm of the main operating lever. The rear arm of the lever thus comprises parts which are integral with the forked arms 22 and 23, thus affording a very strong and desirable lever.

A crank pin or eccentric 37 upon or which may form an integral part of the main driving shaft 9, already described, extends into the longitudinally elongated opening or slot in the lever 11 formed by the slots or openings 32, 33 and 34, and is provided with a peripheral annular collar 38, as shown in Figs. 6 and 6ª. A bearing block, consisting of a bottom member 39 and a top member 40, is mounted upon the crank pin or eccentric 37, as shown in Figs. 6 and 6ª and inserted between and in sliding engagement with the slotted portions of the rigidly connected lever members 15, 16 and 17, with the lower flange 41 of the block member 39 and the upper flange 42 of the block member 40 between and in sliding engagement with the slotted rear end portions of the lever members 15 and 16. (See Figs. 6 and 6ª.) The rear end of the forked or slotted portion of the member 15 is adapted to abut against the forward end of the part 43 shown in Fig. 7, so that when the parts are assembled the part 43 and the rear forked portion of the member 15 will be in alinement on one side of the slotted member 17 and of the sliding block formed of members 39 and 40, and the rear slotted end portion of the part 16 will be on the opposite side of the part 17 and of the sliding block, and the sliding or bearing block with its flanges 41 and 42 will be movable freely between the slotted end portions of the parts 15 and 16 thus secured on opposite sides of the block. The sliding block is thus securely held in operative position and is adapted to slide freely within the socket thus formed by the members 15, 16 and 17 and the main operating lever is thus operatively connected with the main driving shaft in an efficient manner and is adapted to form a suitable connection between the main driving shaft and the rivet-splitting and clenching tool or plunger for operating said tool mounted in the lower jaw of the main frame, and with the means for feeding the rivets into position to be operated upon, which feeding means is mounted upon the upper jaw or head of the main frame.

Located between the forked arms 22 and 23 of the main operating lever thus pivotally mounted in the lower jaw of the main frame, is a vertically movable plunger or cutter-supporting member 24 which is slidably supported in the lower jaw of the main frame and operatively connected with the forked arms of the main operating lever by means of links 25. These links are located on the opposite sides of the plunger 24 and have upper bearing portions 26 pivotally connected with the plunger, preferably by means of sockets 27 in opposite sides of the plunger into which the upper bearing portions of the links extend. The lower end of each link is connected with the corresponding forked arm of the plunger in a similar manner by means of a horizontal pivot or head portion 28 of the link which extends into a socket or annular recess 29 in the corresponding forked arm of the main operating lever. (See Figs. 5, 6 and 7.) The plunger 24 which is slidably mounted in a vertical bore or aperture 30 in the lower jaw of the main frame (see Figs. 5, 16 and 17) is thus adapted to form a support for a riveting, splitting and clenching tool or cutter 31 which is moved into and out of engagement with the rivets to be operated upon by means of the main operating lever 11.

In order to enable the rivet-splitting and clenching tool or cutter 31 to be adjustably supported in the vertically movable plunger 24, and to provide means adapted to engage the rivet to be operated upon in such a manner as to hold the rivet firmly in proper position with relation to the rivet-splitting and clenching tool or cutter during the splitting operation or upward movement of the splitting and clenching tool or cutter, a tool holder 44, which is by preference cylindrical, is slidably mounted in a vertical, axial recess 45 in the plunger 24 (see Figs. 16 and 17), and a threaded adjusting screw 46 is mounted in threaded engagement with an axial opening 47 in said tool holder and provided with a depending stem 48 which extends downward through and beyond the bottom end of the plunger 24 and is provided with an angular end portion 49, or other suitable means, adapted to enable the adjusting screw to be turned as desired in either direction in order to raise or lower the adjusting screw and thereby the cutting tool 31 with respect to the tool holder 44.

The plunger 24 is provided with a horizontal or forwardly projecting boss 50 which is located in a vertically elongated slot 51 in the lower jaw or main frame of the machine and adapted to slide in said slot as the plunger 24 is reciprocated or raised and lowered by means of the main operating lever 11. A set screw 52 anchored in the hollow plunger 24 extends, by preference, through said boss and has its inner end in abutting engagement with and adapted to securely hold the tool holder 44 in any desired position to which said tool holder may be adjusted with respect to the main body portion 24 of the plunger. (See Fig. 16.)

The tool holder or inner plunger member 44 is provided with a head 53 through which the splitting and clenching tool 31 projects, and inclined guide arms or braces 54 are slidably mounted in inclined grooved portions 55 of the head. These braces or guide arms 54 each extend upward and inward at an incline to the upper end of the cutting tool and are each provided with an inner inclined surface portion 58 adapted to slidably engage a similarly inclined surface portion 59 at the bottom or inner side of the groove in which such brace or guide arm is mounted. Springs 60 which are preferably substantially U-shaped are so arranged that each yieldingly engages both of the braces or guide arms 54, each inwardly pressing end 61 of each spring being in engagement with a different brace or guide member 54. (See Figs. 16 and 17.) The members 54 are provided at their upper ends with notched portions 56, adapted to admit and embrace the body of a rivet therebetween and to slidably engage and brace the rivet and firmly hold it in proper position during the upward movement of the cutting tool in the operation of splitting and clenching the rivet. The upper notched ends of these inclined braces or guide members 54 are, by preference, provided with substantially flat upper surface portions adapted to engage the lower surface of an article 57 to be operated upon. The article is thus enabled to be forced upward with the upward movement of said guide arms or braces and of the cutting tool or plunger until the article comes into engagement with the head of the rivet and also into engagement with the bottom face of the upper jaw or head of the machine, so as to cause the rivet to be forced through the material to be operated upon or force the material into position to surround and support the rivet.

The cutting tool is provided at its upper end with a central horizontal cutting edge 62 adapted to engage the end of a rivet and to split the desired portion of the rivet longitudinally into equal, connected, longitudinal, diverging sections or split portions. (See Fig. 3.) The cutting end of the tool 31 also has inclined rivet-engaging and bending surface portions 63 extending downward and outward at an incline upon opposite sides of the horizontal cutting edge of the tool and preferably slightly curved so as to engage the inner sides of the opposite longitudinal sections or split portions of the rivet and bend them upward and outward and clench them in engagement with the material through which the rivet extends. (See Figs. 3, 4, 16 and 17.)

In operation, the cutter tool has three distinct functions, viz: the splitting of the rivet stem, the spreading of the split portions apart, and the bending of the split portions backward and toward the head of the rivet and into clenching engagement with the material to be riveted, said material being forced onto the rivet stem or into position to extend between the head and split portions. The converging surface portions of the cutter, which meet at the cutting edge 62, serve to spread the split portions of the rivet stem apart, and the split portions of the rivet stem are bent backward and toward the head of the rivet by bending means, which comprises or consists of the outer curved portions of the surfaces 63 which extend outward laterally at an angle with respect to the upper converging surface portions which meet at the cutting edge and constitute the side faces of the tapered edge portion or cutting edge 62. (See Figs. 3, 4, 16 and 17.) The horizontal cutting edge of the cutting tool is by preference, in the same vertical plane with the longitudinal centers of the inclined yielding braces or guide arms 54, which are in the same vertical plane with the axial center of the plunger and cutting tool. The inclined rivet-engaging or rivet-binding and clenching surfaces 63 of the cutting tool are thus adapted to bend the opposite sections of the split portion of the rivet upward and outward transversely with respect to and between the ends of the inclined guide arms and into clenching position. The inclined edges of the tapered or wedge-shaped part 63' of the cutting tool are adapted to slidably engage the upper ends of the guide arms or braces 54 and spread or force them apart as the cutting tool is forced upward in the operation of splitting and clenching the rivet.

The springs 60 are sufficiently yielding to permit the guide arms or braces 54 to move outward and downward with respect to the point of the cutter and with respect to the tool holder from the position in which they are shown in Fig. 16 to the position in which they are shown in Fig. 17, when the material through which the rivet extends is arrested in its upward movement by coming into contact with the rivet head and with the upper jaw or head member $f$, thus permitting the cutting edge of the tool to pass upward between the ends of the spring-pressed arms 54, and the guide arms are provided at their bottom ends with inwardly extending hooked portions 64 adapted to limit the upward movement of the guide arms or braces with respect to the tool holder. Supplementary springs 65 may be adjustably mounted upon each of the U-shaped springs 60. These springs 65 are adapted to be moved toward and from the ends of the U-shaped springs to increase the pressure upon the guide arms or braces 54 when desired, and may be slipped away from the ends of the U-shaped springs when it is desirable to reduce the pressure upon said guide arms or braces.

By so mounting the U-shaped springs 60 that each spring has a lower end in engagement with the recessed lower portion of one guide arm and an upper end in engagement with the upper recessed portion of the opposite guide arm, as shown in Figs. 1, 5, 16, 17 and 18, the guide arms are yieldingly held in operative position in an efficient manner and are adapted to be readily removed and replaced in order to enable the tool to be adjusted or sharpened or for any other purpose.

In order to provide means for automatically feeding rivets successively into position to be supported by the rivet-supporting member $l$ and operated upon by the rivet-splitting and clenching tool or cutter, a pivoted reciprocating rivet-feeding arm or finger 66 is provided which is supported by the upper jaw of the main frame, being by preference secured in operative position by means of a bolt or supporting member 67 which extends through the adjustable upper head member $f$ and is securely held in position by means of a nut 68 and provided with a vertical pivot pin 69 forming a pivotal connection between the arm or finger 66 and said bolt or support 67. (See Figs. 1, 5, 14 and 15.) The arm or feeding finger 66 is so mounted as to swing upon the vertical axis formed by the pivot pin 69 and is, by preference, so connected with the pin 69 by means of a horizontal pivot 70 as to permit the arm or finger to swing downward and forward in a curved path, as indicated by the dotted line 71 in the operation of feeding a rivet $m$ from the position in which the lowermost spring-engaged rivet is shown in broken lines in said Fig. 14 to the position in which the rivet is shown in full lines in said figure, and to swing upward and rearward during the movement of the feeding arm or finger 66 from the position in which it is shown in full lines in Fig. 5 to retracted position or the position in which it is shown in Fig. 14. The outer swinging or rivet-engaging end of the arm or finger 66 is provided with an approximately V-shaped notch 71' in its forward edge between tapered rivet-engaging projections or tongues 72 and 73, and is provided with a rearwardly extending curved guard 74 adapted to slidingly engage a stationary guide 75 during the reciprocating movements of the feeding finger or arm. The feeding finger or arm 66 is moved downward and forward from the position in which it is shown in Figs. 14 and 15 to the position in which it is shown in full lines in Figs. 1 and 5, by means of a lever 76 which is pivotally supported upon the upper jaw $d$ of the main frame between projecting lugs 77 by means of a pivot 78. The upper arm of said lever is in sliding engagement with the under surface of the laterally projecting portion 80 of the auxiliary lever 3, already described, and is adapted to be moved downward with the downward movement of said auxiliary lever and permitted to move upward with the upward movement of the forward arm 2 of said lever.

The lower arm of the lever 76 is operatively connected with the reciprocating feeding arm or finger 66 by means of a spring link or spring and telescoping connecting mechanism such as is shown in Figs. 14 and 15. This spring link and telescoping mechanism comprises a tube or sleeve member 81 having a shank 82 at one end thereof pivotally connected with the arm or finger 66 by means of a pivot 83 and a pin or inner telescoping member 84 slidably mounted in and extending longitudinally of the tubular member and having a shank 85 at the end of said pin most remote from the shank 82 of the tubular member and secured to the lower end of the lever 76 by means of links 86 and 87 and a nut 88 upon the end of the lever 76 which extends through the last mentioned link.

Tension springs 89 located on opposite sides of the telescoping tubular and rod or pin members 81 and 84 have their opposite ends secured to the shanks 82 and 85, respectively, by means of hooks 90 or other suitable securing means, so that the movement of the lower arm of the lever 76 outward will stretch the springs and move the rivet-feeding arm or finger 66 downward and forward from the position shown in Fig. 14 into position to come into contact with the body of a rivet $m$ located in the path of movement of the rivet-engaging notch 71 of the finger, as shown in broken lines in Fig. 14, carrying said rivet from the position in which it is shown in broken lines in Fig. 14 to the position in which it is shown in full lines in said figure or into position to be supported by the rivet-supporting slide $l$ directly above and in position to be engaged by the rivet-splitting and clenching tool or cutter 31. The movement of the rivet-feeding arm or finger 66 to retracted position or the position in which it is shown in Figs. 14 and 15 is accomplished by means of the tension spring 91 one end of which is secured to a suitable support, such as the guide or bracket member 75 which is provided with a lug 92, as shown in Fig. 14, for the purpose. The opposite end of the spring is connected with the outer swinging end portion of the rivet-feeding arm or finger 66 to which it is secured by means of a lug 93 on said swinging arm or finger, as shown in Figs. 14 and 15.

The rivets are automatically fed into position to be automatically engaged and operated upon by the feeding finger or arm 66 by means of an inclined chute 94 having a bottom groove 95 formed between the bottom portions 96 of the two inclined side members 97 which are formed preferably of sheet metal and secured to opposite sides of a supporting rib or main body member 98, as shown in Fig. 5. (See also Figs. 1 and 14). A spring 99, secured to one side of the chute by means of staples 100 or other suitable securing means, has a lower end portion 101 extending alongside of the bottom groove 95 of the chute and in parallel relation to said groove and adapted to yieldingly engage the bodies of the rivets as they slide downward through the chute by force of gravity into engagement with said spring. The outwardly curved end portion 102 of the spring extends into the path of movement of the notched portion or rivet-engaging tongue 72 of the reciprocating arm 66 and is adapted to be moved transversely away from the rivet-containing groove of the chute, so as to permit the rivets to move downward into position to be engaged by the notched portion of the arm 66.

In order to prevent an undesirably large number of rivets from accumulating in the lower portion of the chute, reciprocating feeding fingers 103 and 104 are mounted upon the chute by means of a suitable support 105 in position to alternately extend across the groove in the bottom of the chute. (See Fig. 14). The reciprocating finger 103 is provided with a notch 106 in the inner edge thereof and the finger 104 is provided with a similar notch 107 in its inner edge, and a central plate or key 108 is mounted intermediate the reciprocating fingers 103 and 104 in position to extend into said notches and is operatively connected with an operating lever 109 which in the form here shown is made integral with a rotary disk portion 110, to the axial center of which the plate or rotary key 108 is fixed. The movement of the lever 109 with its disk in one direction about the axial center of the disk, which is also the axial center of the plate 108, to the position shown in Fig. 14, will cause the inner end of the finger 104 to extend across the passage 95 in the chute and into position to engage and prevent the downward movement of all rivets contained in such chute above said finger until the finger is withdrawn.

It will be readily seen that the movement of the lever 109 toward the right, or in the direction of the lower portion of the chute, from the position in which it is shown in Fig. 14, will cause the central plate or key 108 to rotate with the lever 109 and disk 110 a sufficient distance to move the finger 103 into position to extend across the groove 95, at the same time withdrawing the finger 104, so as to permit rivets to pass along the groove until the lowermost rivet located above the finger 103 will come into contact with said finger and be in position to be released with the next movement of the lever 109 which will cause the finger 103 to be moved back to the position in which it is shown in Fig. 14. The rivets are thus permitted to pass successively downward into engagement with the spring member 101 and into the path of movement of the notched portion of the reciprocating pivoted feeding arm or finger 66. The lever 109 is, by preference, provided with a spring 111 for operating it and thereby the reciprocating fingers 103 and 104 in one direction, one end of said spring being secured to a stationary member such as an arm 112 on the chute, or other suitable support, and the opposite end of the spring being secured to said lever in any desired suitable manner.

An operating rod or link 113 is connected at its upper end with the lever 109 and at its lower end with the main operating lever 11, the lower end of said link being provided, by preference, with an elongated slot 114 through which extends a bolt 115 by means of which said rod or link 113 is secured to the main operating lever. The elongated slot 114 is adapted to permit sufficient lost motion to enable the lever 109 and the reciprocating fingers 103 and 104 to be operated in an efficient manner in one direction by means of the rod 113 during the upward movement of the rear arm of the lever 11 and in the opposite direction by means of the spring 111, or said spring and the rod.

A rotary rivet-containing drum or rivet supply receptacle 116 is mounted at the upper end of the chute 94, said drum being supported in inclined operative position by means of a bracket 117 which is secured to the chute 94 by means of a set screw 118, the drum being provided with a central inclined shaft 119 which extends longitudinally through the drum and is secured, by preference, in fixed relation thereto. An upper head 120 and lower head 121 are also secured in fixed relation to the cylindrical casing or drum 116. (See Figs. 1, 12 and 13.)

The lower rotary drum head 121 is provided with a series of radial slots 122, as shown in Fig. 13, each of suitable dimensions to admit the body portion or stem of a rivet when the head of such rivet is in position to extend into the annular space 123 between the lower drum head or rotary disk 121 and the casing or shell 116. A non-rotatable plate or disk 124 is mounted adjacent to and outside of the radially slotted rotary drum head or disk 121 and is provided with a radial slot 125 in its upper peripheral portion, as shown in Figs. 12 and 13. This slot 125 is adjacent to the upper end of the slot or groove 95 of the inclined chute and between the said chute and the radially slotted rotary drum head or member 121 (see Fig. 12), and is adapted to permit rivets to pass from the interior chamber 126 through any slot 122 which may come into position to connect or register with the slot 125 and through the slot 125 into the passage or groove 95 of the inclined chute with the heads of the rivets in the space between the main body or central rib 98 of the chute and the bottom portions 96, and the bodies or necks of the rivets extending downward through the passage 95, as indicated in Fig. 5. The central portion 127 of the radial slot 125 in the non-rotatable disk member 124 is made relatively large and substantially circular in cross-section, so as to permit imperfect rivets to pass therethrough and prevent them from passing into the inclined passage of the chute 94.

An inner threaded rod 128 in threaded engagement with an inwardly projecting stud 129 extends into a suitable opening 130 in the rotary lower head member 121 of the drum and is adapted to enable the member 121 to be adjusted longitudinally of the casing or drum cylinder and to rotate with the latter and with the shaft 119.

A pin 131 upon the bracket 117 extends into a recess in a boss 132 on the stationary disk 124 and is adapted to secure said stationary disk against rotation with the drum and to form a support for a compressible spring 133 on said pin and which extends into the recessed boss 132 so as to yieldingly hold the stationary disk in operative position with respect to and in yielding engagement with the lower laterally grooved drum head member 121. (See Fig. 12.)

A strap or flexible element 134 extends over the rotary cylindrical drum or casing 116 and is provided at its outer end with a weight 135 secured to said strap and in slidable engagement with a vertical guide rod 136, as shown in Fig. 1, the opposite end of said strap being secured to an operating lever 137 which is pivotally supported upon the main frame or upper jaw of the machine by means of a horizontal pivot 138, the opposite end 139 of said lever being mounted between lugs 140 and 141 upon the vertically operating connecting rod or pitman 10, already described, and adapted to be reciprocated with the upward and downward movement of said rod or pitman. (See Figs. 1 and 15.) By this arrangement it will be readily seen that the strap or flexible element 134 will be held tightly in engagement with the rotary cylinder or drum 116 when the lever 137 is operated by the downward movement of the connecting rod or pitman 10, or in a direction which will raise the weight 135, and that the quick movement of the rod or pitman 10 in the opposite direction will release the tension of the strap and permit the strap to be drawn down by the weight 136 without turning the drum during the downward movement of the weight 135 and weighted end of the strap. The spring 133 produces sufficient friction to prevent the backward rotation of the drum during the downward movement of the released weight 135. The main driving shaft 9, already described, is adapted to be operatively connected with a suitable source of power by means of a belt pulley or other suitable gear 142 which is loosely mounted upon the shaft 9. (See Fig. 1.)

A clutch for enabling the main driving shaft 9 to be operatively connected with and disconnected from the belt pulley or source of power is provided and in its preferred form comprises in its construction a cylindrical member 143 having longitudinal peripheral grooves 144, 144 and 145. A longitudinally movable key or locking bolt 146 is slidably mounted in the peripheral groove 145 and a longitudinally slidable yoke, cam or tripping member 147 is mounted in position to partially encircle the cylindrical main body of the clutch member 143 and is provided with inwardly projecting end portions 148 each adapted to extend into and to slide longitudinally of a groove 144 in the clutch member 143. (See Figs. 1, 8 and 10.)

Tension springs 149 are each adapted to be secured at one end to the sliding yoke or cam member 147 and at the opposite end to the cam member 143 by means of pins 150 or other suitable securing means. (See Figs. 1 and 10.) The clutch key or locking bolt 146 has a preferably cylindrical end portion 151 which is adapted to be moved by means of the springs 149 with one movement of the sliding yoke or cam member 147 into position to project endwise beyond the end of the clutch member 143 in which position the end 151 will extend into any one of the annular series of recesses 152 in the rotary clutch member or hub 153 which may happen to be brought into alinement with the bolt 146, or into position to receive said end portion of said locking bolt, pin or key. The recessed clutch member or disk 153 is secured in fixed relation to the pulley 142 or may form an integral part or hub portion thereof. (See Figs. 1 and 11.)

A reciprocating trip member, cam or shoe 154 having a preferably vertical operating arm 155 and provided with movable guiding side arms 156 is slidably mounted in a suitable rigid stationary supporting member 157 on the main frame of the machine in position to enable said shoe to be moved into and out of position to engage the cam surface portion 158 of the cam member or yoke 147. (See Figs. 1, 8 and 9.) This shoe 154 is adapted to extend between the relatively narrow portions of the cam member or yoke 147 and the peripheral or radial end flange 159 of the clutch member 143 in one position—thereby serving to throw the clutching bolt 146 out of clutching engagement with the clutch member 153 against the tension of the springs 149—and to be raised out of engagement with the yoke or cam member 147 to permit the yoke and locking bolt 146 to be moved longitudinally of the clutch member 143 by means of the springs 149 into clutching engagement with the clutch member 143 or into operative engagement with the belt pulley or gear wheel 142 to which the member 143 is secured. A lever 160 is pivotally mounted upon a suitable supporting arm or bracket 161 and is connected at one end with the upper end 162 of the operating stem 155 of the tripping shoe or cam member 154, the opposite end of said lever 160 being connected with an operating lever or member 163 by means of a connecting rod or link 164. (See Fig. 1.) The lever 163 is pivotally mounted upon a suitable support 165 by means of a pivot 166 and is operatively connected with a trip-lever or pedal member 167 having a fulcrum 168 and operatively connected with the lever 163 by means of lugs 169 on the lever 163 and a pivot pin 170 extending through said lugs and through the end portion of the lever 167 located between the lugs.

A modified form of the upper head or jaw member and of the feeding devices supported thereby and adapted to be operated by the actuating mechanisms already described is shown in Figs. 19, 20 and 20ª, in which the head 171 which corresponds with the adjustable head member $f$, already described, is shown adapted to be connected with or to form an integral part of the main upper jaw member $d$, already described. In case it is desired to adjustably secure the head member 171 to the main upper jaw member, a stud or bolt 172 anchored in the main upper jaw member is provided and extends through a suitable perforation in the member 171, and a nut 173 is mounted in threaded engagement with the bolt and adapted to hold the head or jaw member 171 securely in any desired position to which the latter is adapted to be adjusted. Inclined rivet-supporting arms 174 are movably mounted upon the head or jaw member 171, preferably by means of a bolt 175, which may be mounted in threaded engagement with the head 171, and provided with a bearing edge or arm-supporting portion 176 in supporting engagement with a recessed portion 177 of each of the arms 174 which are located one forward and the other rearward of the head 171 and in position to extend downward and inward so that the lower ends 178 of the rivet-supporting arms will extend below and part way across the bottom surface 179 of the head 171 in position to support a rivet 180 therebetween. These arms are yieldingly held in operative or rivet-supporting position by means of one or more U-shaped springs 181 which correspond in construction and mode of operation to the U-shaped springs already described and shown in connection with the rivet-supporting braces or guide arms on the plunger shown in Fig. 1. The U-shaped spring 181, shown in Figs. 19 and 20, embraces the head member 171 and has one inwardly pressing end mounted in a recess 182 in one of the inclined supports 174 and its opposite end in a similar recess 182 in the other rivet-supporting arm, so that the arms are yieldingly held in position to admit and support the head of a rivet between the notched portions 183 of said rivet-supporting arms. (See Figs. 19, 20 and 20ª.)

Each of the rivet supporting arms is provided with an inner inclined bearing surface portion 184 adapted to engage the supporting portion 176 of the supporting bolt 175, in such a manner as to permit the inclined arms 174 to be swung outward against the tension of the spring 181 sufficiently to permit a rivet to be withdrawn after having been split and clenched in engagement with the article to be operated upon or riveted. The forked arm portions 185 at the opposite ends of the bolt or support 175, and between which the rivet-supporting arms 174 extend, serve to hold the upper ends of the inclined arms in operative position, and the lower ends of the arms 174 extended into recesses 186 in the head 171. (See Figs. 19, 20 and 20ª.)

A pivoted reciprocating rivet-feeding arm or lever 187, similar to the rivet-feeding lever or arm 66 already described, is supported by the head 171 with which it is pivotally connected by means of a supporting arm or bolt 188 secured in position in the head by means of a nut 189, or any other suitable securing means, and having a vertical pivot 190 supported by the rearwardly projecting end of the bolt or arm 188 and operatively connected with and forming a pivotal support for the arm 187. The arm 187 is pivotally connected with the pivot 190 by means of a horizontal pivot 191, so that said rivet-feeding arm is adapted to swing upon the vertical pivot and also upon the horizontal pivot from the position in which it is shown in Fig. 19 downward and forward into position to carry a rivet 180, the body of which is engaged by the tapered or V-shaped notch 192, to the position in which such rivet is shown in Fig. 19 or into position between the rivet-supporting arms 174 which hold the rivet during the operation of splitting and clenching the same.

The above described operation is accomplished by means of the lever 76 which is operatively connected with the rivet-feeding arm or lever 187 by means of telescoping link members and springs which may be of the same construction as those already described and shown for connecting the lever 76 with the arm or lever 68, such connecting mechanism comprising springs 193 attached to a shank 194, which is adapted to be in turn connected with the lever 76, the opposite ends of said spring being connected with a shank 195 which is connected with the lever arm 187 by means of a link or arm 196, the shank 195 being provided with an outer tubular telescoping member 197 in which is slidably mounted a pin 198 secured to the shank 194.

In order to provide means for moving the rivet-feeding arm 189 upward and rearward from its downward limit of motion to the position in which it is shown in Fig. 19, a spring 199 is connected at one end with the lever or arm 187 and at its opposite end with a stationary flexible guide arm 200, which guide arm is supported by the supporting member or bolt 188, already described, in position to form a flexible guide for the rivet-feeding arm 187 which has a rearwardly extending curved guide arm 20¹ adapted to slidably engage the downwardly extending end of the guide 200. A pivoted guard plate 202, pivotally secured in position to extend beneath and in sliding engagement with the bottom surface of the head 171, is pivotally supported in operative position adjacent the bottom end of the chute 94 by means of a pivot 203 located intermediate the axial center of the feeding arm 187 and the end of the chute 94, the pivoted end plate being so constructed as to swing outward and away from the end of the chute when the rivet-feeding finger 187 engages a pivot located in the notch 204 in the plate 202, in the operation of feeding such rivet downward and forward into the position in which it is shown in Fig. 19 between the rivet-supporting arms 174. The plate is yieldingly held in position by means of a tension spring 205 one end of which is connected with a stationary support or pin 206 and the opposite end of which is connected with the plate, as shown in Fig. 20.

In Fig. 21 is shown a pair of inclined rivet-supporting arms 207 which may be of substantially the same construction as the similar rivet-supporting arms 54 shown on the plunger in Fig. 1 and already described in detail. These arms 207 are supported upon the head 208 by means of adjustable inclined supporting plates or blocks 209 each of which is provided with a transversely elongated slot 210 through which extends an adjusting and securing bolt or screw 211. The supporting arms 207 are yieldingly held in operative position by means of U-shaped springs 212 and supplementary springs 213 in the manner already described in connection with the similar rivet-supporting arms or braces 54.

By this arrangement, it will be readily seen that the blocks 209 in which the arms 207 are supported are adapted to be adjusted transversely of the head 208 in which the cutter tool 31 is supported in the manner already described in connection with the form of plunger and cutter-supporting device already described and shown in Fig. 1, thus enabling the device shown in Fig. 21 to be used in an efficient manner in connection with a stationary upper jaw or head, when desired, although even in connection with the form of device shown in Fig. 21 the upper head member 171 is, by preference, adjustably mounted.

In operation, the rivet-containing receptacle 116 is rotated by hand, or in any desired manner, until rivets pass down the chute 94 into position to be engaged by the pivoted reciprocating rivet-feeding arm or member 66. The trip member 154 of the clutch for connecting the main drive shaft or crank shaft 9 with the belt pulley or power drive wheel 142, is then raised by operating the pedal, thus permitting the clutch member 147 to be moved by its operating springs into clutching position, the trip member 154 being released so as to be in position to throw the clutch out of clutching position at the completion of an operation. The parts being in the position indicated in Figs. 1 and 5 as they would naturally be after the movement of the part 66 from the position in which it is shown in broken lines in Fig. 5 to the position in which it is shown in full lines, carrying with it a rivet m to the position in which the rivet is shown in Fig. 5, and all of the other parts of the device being in the corresponding positions as shown in Figs. 1, 5 and 6 the material to be riveted being inserted between the rivet and the cutting tool when the plunger is down, so that the rivet will penetrate the material when the plunger comes up, the first part of the rotation of the crank shaft which turns upon operating the trip member 154 will operate the main operating lever in a direction to throw the plunger 24 with its tool holder 44 and cutting and clenching tool 31 upward into position to engage the rivet m, or from the position in which the cutting tool and plunger are shown in Figs. 1 and 5 to the position in which the same are shown in Fig. 16. At the same time, the forward end of the auxiliary operating lever 3 is shoved upward from the position in which it is shown in full lines in Fig. 5 to or in the direction of the position in which it is shown in broken lines in said figure. The first part of this upward movement of the auxiliary lever permits the upward movement of the lever arm 79 which, in turn, permits the pivoted rivet-feeding arm 66 to move from the position in which it is shown in Fig. 5 to retracted position in which it is shown in Figs. 14 and 15. The last part of the upward movement of the auxiliary lever 3 serves to operate the lever v by means of the loosely connected rod 4, (see Fig. 1), so as to cause the rivet-holding member or rivet-holding member or rivet-supporting slide l to be moved transversely away from the position in which it is shown in Fig. 1. This movement of the slide l occurs during the upward movement of the cutter 31 from the rivet-engaging position in which it is shown in Fig. 16 to the position shown in Fig. 17, or during the splitting and clenching of the rivet. During the movement of the cutter from the position shown in Fig. 16 to the position indicated in Fig. 17, the yielding brace arms 54 move the work or material 57 to be operated upon upward with the cutting tool, so that the rivet is embedded therein, and these brace arms slide upward longitudinally of the rivet so as to brace the rivet during the splitting and clenching of the same. (See Figs. 16 and 17.) The reciprocation of the main operating lever 11 operates the lever 137, shown in Fig. 5, which is connected with the strap 134 and causes the rivet-containing receptacle or drum 116 to be rotated so as to feed the rivets into the inclined chute 94, and the feeding arms 103 and 104 are also automatically operated through the medium of rod 113 connected with the main operating lever and the springs 111. (See Figs. 5 and 14.) It will thus be seen that a rivet is split and clenched during a single or continuous operation of the machine and that the rivet is braced during the operation of splitting and clenching the same by the yielding brace arms 54 which move with the tool. The downward movement of the auxiliary lever 3 to initial or normal position, which occurs during the downward or return movement of the tool 31 and the plunger suppporting the same, permits the rivet-holding slide $l$ to move to the position in which it is shown in Fig. 1, and also causes the forward transversely extending portion of the lever 3 to move the lever arm 79 downward and the other arm 75 of the same lever outward to the position shown in Fig. 1, thus moving the pivoted rivet-feeding member or arm 66 from the position in which it is shown in Fig. 14 into position to engage a rivet $m$ located in its path and yieldingly held by the spring 101,—as indicated in broken lines in Fig. 14—into engagement with and into position to be supported by the rivet-supporting slide $l$ directly beneath the rigid face of the head or jaw member $f$ and in position to be engaged by the cutter 31 when moved upward in the operation of splitting and clenching the rivet.

I claim:

1. A riveting machine, comprising means for holding a rivet in position to be operated upon, and a cutting tool having a transverse cutting edge movable with the tool into cutting engagement with the stem of the rivet, for splitting the same; said cutting tool being provided on opposite sides of said transverse cutting edge with inclined portions which meet in said cutting edge and diverge outwardly therefrom; the inclined portions serving to spread the split portions of the rivet stem laterally from each other, and said cutting tool being provided at the bases of said inclined portions with rivet-bending surfaces for bending the split portions of the rivet stem backward toward the head and into clenching engagement with material to be riveted.

2. A riveting machine, comprising means for holding a rivet in position to be operated upon, and a cutting tool provided with a transverse cutting edge movable with the tool into engagement with the stem of the rivet for splitting the same; said cutting tool being provided on opposite sides of said transverse cutting edge with inclined portions which meet in said cutting edge and diverge outwardly therefrom; the inclined portions serving to spread the split portions of the rivet stem laterally from each other, and said cutting tool being provided at the bases of said inclined portions with rivet-bending surfaces integral therewith and serving to bend the split portions of the rivet stem backward toward the head of the rivet.

3. In a riveting machine, the combination of means for holding a rivet in position to be operated upon, a plunger, a cutter supported by and movable with the plunger and provided with a cutting edge movable into and out of engagement with such rivet, and rivet-bracing mechanism supported upon the plunger and normally projecting beyond the cutting edge of the tool in the direction of a rivet to be operated upon.

4. In a riveting machine, the combination of means for holding a rivet in position to be operated upon, a plunger, a cutter supported by and movable with the plunger and provided with a cutting edge movable into and out of engagement with such rivet, rivet-bracing mechanism supported upon the plunger and normally projecting beyond the cutting edge of the tool, and means for yieldingly holding the rivet-bracing mechanism in operative engagement with a rivet during the operation of splitting and bending the rivet.

5. In a riveting machine, the combination of a rivet-supporting head, means for holding a rivet in engagement with said head in position to be operated upon, a plunger, and a cutting tool supported by the plunger and provided with a transverse cutting edge movable into and out of cutting engagement with a rivet to be split, said cutting tool having rivet-bending surface portions on opposite sides of the cutting edge adapted to engage and bend portions of the rivet located on opposite sides of such cutting edge during the engagement of the cutting edge with the rivet.

6. In a riveting machine, the combination of a rivet-supporting head, means for holding a rivet in engagement with such head, a cutter provided with a transverse cutting edge movable into and out of engagement with such rivet, rivet-bracing members yieldingly supporting on opposite sides of and movable with the cutting tool and adapted to engage a rivet engaged by the cutting edge of the cutting tool, and means for yieldingly holding the rivet-bracing members in sliding engagement with a rivet to be operated upon.

7. In a riveting machine, the combination of a rivet-supporting head, means for holding a rivet in engagement with such head and in position to be operated upon, a cutter provided with a transverse cutting edge movable into and out of engagement with such rivet, rivet-bracing members yieldingly supported on opposite sides of and movable with the cutting tool and adapted to engage a rivet engaged by the cutting edge of the cutting tool, means for yieldingly holding the rivet-bracing members in sliding engagement with the rivet, and means for reciprocating the cutting tool.

8. In a riveting machine, the combination of a rivet-supporting head, means for holding a rivet in engagement with such head and in position to be operated upon, a cutter provided with a transverse cutting edge movable into and out of engagement with such rivet, rivet-bracing members yieldingly supported on opposite sides of and movable with respect to the cutting tool and adapted to engage a rivet engaged by the cutting edge of the cutting tool, means for yieldingly holding the rivet-bracing members in sliding engagement with the rivet, and means for reciprocating the cutting tool.

9. In a riveting machine, the combination of a rivet-supporting head, means for holding a rivet in engagement with such head in position to be operated upon, a cutter provided with a cutting edge extending transversely across one end thereof and movable into and out of engagement with such rivet, rivet-bracing members yieldingly supported on opposite sides of and movable with respect to the cutting tool and adapted to engage a rivet engaged by the cutting edge of the cutting tool, said cutting tool having rivet-engaging surface portions extending on opposite sides of the cutting edge of the cutting tool and transversely with respect to the rivet-bracing members, and means for yieldingly holding the rivet-bracing members in sliding engagement with the rivet.

10. In a riveting machine, the combination of a rivet-supporting head, means for holding a rivet in engagement with said head in position to be operated upon, a plunger, a cutting tool supported by the plunger and provided with a transverse cutting edge movable into and out of cutting engagement with a rivet to be split, said cutting tool having curved rivet-bending surface portions on opposite sides of the cutting edge adapted to engage and bend portions of the rivet located on opposite sides of such cutting edge during the engagement of the cutting edge with the rivet, rivet-embracing mechanism mounted in movable relation to the cutting tool and adapted to extend beyond the cutting edge of said tool into position to engage the rivet to be operated upon, and spring mechanism in engagement with said rivet-embracing mechanism.

11. In a riveting machine, the combination of means for holding a rivet in position to be operated upon, a plunger, a cutter supported by and movable with the plunger and provided with a cutting edge movable into and out of engagement with such rivet, rivet-embracing mechanism slidably supported upon the plunger and normally projecting beyond and in movable relation to the cutting edge of the tool, spring mechanism in engagement with the rivet-embracing mechanism for yieldingly holding the latter in operative engagement with a rivet during the operation of splitting and clenching the same, and means for reciprocating the plunger and the cutter supported thereby.

12. In a riveting machine, the combination of a main frame provided with an upper jaw and a lower jaw, a rivet-supporting head adjustably secured to one of said jaws, a reciprocating plunger mounted in the other of said jaws and movable toward and from said rivet-supporting member, a cutting tool supported by said plunger and provided with a transverse cutting edge movable into and out of engagement with such rivet, means for automatically feeding rivets successively into position to be supported by the rivet-supporting member, and means for reciprocating the plunger and cutting tool.

13. In a machine of the class described, the combination of a rivet-supporting head, a rivet-holding member movably mounted on such head and adapted to hold a rivet in position to be operated upon, a cutting tool provided with a cutting edge movable into and out of engagement with such rivet, means for operating the cutting tool, means for automatically feeding rivets to be operated upon into position to be engaged and supported by said movable rivet-supporting member, and means for automatically moving the movable rivet-holding member into and out of rivet-supporting position.

14. In a riveting machine, the combination of a main frame provided with an upper jaw and a lower jaw, a rivet-supporting member upon one of said jaws, a reciprocating plunger mounted in the other of said jaws and movable toward and from said rivet-supporting member, a cutting tool supported by said plunger and provided with a transverse cutting edge movable into and out of engagement with such rivet, means for automatically feeding rivets successively into position to be supported by the rivet-supporting member, and means for reciprocating the plunger and cutting tool.

15. In a riveting machine, the combination of a main frame provided with an upper jaw and a lower jaw, a movable rivet-holding member upon one of said jaws, a reciprocating plunger slidably mounted in the other of said jaws and movable toward and from said rivet-holding member, a cutting tool supported by said plunger and provided with a transverse cutting edge movable into and out of engagement with such rivet, means for automatically feeding rivets successively into position to be engaged by the movable rivet-holding member, and means for reciprocating the plunger and cutting tool.

16. In a riveting machine, the combination of a main frame provided with an upper jaw and a lower jaw, a rivet-supporting head adjustably secured to one of said jaws and provided with a movable rivet-holding member, a reciprocating plunger mounted in the other of said jaws and movable toward and from said rivet-supporting member, a cutting tool supported by said plunger and provided with a transverse cutting edge movable into and out of engagement with such rivet, means for automatically feeding rivets successively into position to be engaged by the movable rivet-supporting member, means for reciprocating the plunger and cutting tool, and means for operating the movable rivet-holding member on the head.

17. In a riveting machine, the combination of a frame provided with an upper jaw and a lower jaw member, movable rivet-supporting mechanism supported upon the upper jaw member and movable into and out of position to support a rivet in position to be operated upon, a tool-supporting plunger reciprocatingly mounted in the other jaw, a cutting tool supported by said plunger and provided with a cutting edge movable into and out of engagement with such rivet to be operated upon, means for reciprocating the plunger and cutting tool, rivet-bracing members yieldingly supported on opposite sides of and in sliding engagement with the cutting tool and adapted to project beyond the cutting edge of the same in the direction of the rivet to be operated upon, and inwardly pressing spring mechanism in engagement with the rivet-bracing members.

18. In a riveting machine, the combination of a frame provided with an upper jaw member and a lower jaw member, a rivet-supporting plate supported upon the upper jaw member and movable into and out of position to support a rivet in position to be operated upon, means for operating said movable rivet-supporting plate, a tool-supporting plunger reciprocatingly mounted in the other jaw, a cutting tool supported by said plunger and provided with a cutting edge movable into and out of engagement with such rivet to be operated upon, means for reciprocating the plunger and cutting tool, rivet-bracing members yieldingly supported on opposite sides of the cutting tool and adapted to project beyond the cutting edge of the same in the direction of the rivet to be operated upon, and spring mechanism in yielding engagement with said bracing members adapted to yieldingly press the latter inwardly toward the center of the cutting tool and hold said braces in yielding engagement with the rivet during the movement of the cutting tool and braces longitudinally of the rivet.

19. In a riveting machine, the combination of a frame provided with an upper jaw member and a lower jaw member, movable rivet-supporting mechanism supported upon the upper jaw member and movable into and out of position to support a rivet in position to be operated upon, a tool-supporting plunger reciprocatingly mounted in the other jaw, a cutting tool supported by said plunger and provided with a cutting edge movable into and out of engagement with such rivet to be operated upon, means for reciprocating the plunger and cutting tool, rivet-bracing members yieldingly supported on opposite sides of the cutting edge of the cutting tool and adapted to project beyond such cutting edge in the direction of the rivet to be operated upon, spring mechanism in yielding engagement with said braces adapted to yieldingly press the braces inwardly toward the center of the cutting tool and hold said braces in yielding engagement with the rivet during the movement of the cutting tool and braces longitudinally of the rivet, and means for automatically feeding rivets successively into position to be supported by said movable rivet-supporting member.

20. In a riveting machine, the combination of a frame having an upper jaw member and a lower jaw member, a movable rivet-engaging member mounted upon one of said jaw members, means for feeding rivets into position to be engaged by said movable rivet-holding member, a reciprocating plunger mounted upon the other of said members, a cutting tool supported by said plunger and having a cutting edge movable into and out of engagement with a rivet engaged by the movable rivet-holding member, a main driving shaft provided with an eccentric, and a main operating lever pivotally mounted in the frame and operatively connected with said eccentric and with the reciprocating plunger.

21. In a riveting machine, the combination of a frame having an upper jaw member and a lower jaw member, a movable rivet-engaging member mounted upon one of said jaw members, a reciprocating plunger mounted upon the other of said jaw members, a cutting tool supported by said plunger and having a cutting edge movable into and out of engagement with a rivet engaged by the movable rivet-holding member, a main driving shaft provided with an eccentric, a main operating lever pivotally mounted in the frame and operatively connected with such eccentric and with the reciprocating plunger, an auxiliary operating lever operatively connected with the main drive shaft, and with said movable rivet-holding member, for moving the latter into and out of position to maintain a rivet in position to be operated upon, a pivoted reciprocating rivet-feeding member, and means for operatively connecting said pivoted feeding member with the auxiliary lever.

22. In a riveting machine, the combination of a frame having an upper jaw member and a lower jaw member, a rivet-supporting member slidably mounted upon one of said jaw members, a reciprocating plunger mounted upon the other of said jaw members, a rivet-clenching tool supported by said plunger and having a rivet-engaging edge movable into and out of engagement with a rivet supported by the movable rivet-supporting member, a main driving shaft provided with an eccentric, a main actuating lever pivotally mounted in the frame and operatively connected with such eccentric and with the reciprocating plunger, and an auxiliary operating lever operatively connected with the main drive shaft and with said movable rivet-supporting member, for moving the latter into and out of position to support a rivet in position to be operated upon.

23. In a riveting machine, the combination of a frame having an upper jaw member and a lower jaw member, a rivet-supporting member slidably mounted upon one of said jaw members, a reciprocating plunger mounted upon the other of said jaw members, a rivet-clenching tool supported by said plunger and having a rivet-engaging edge movable into and out of engagement with a rivet supported by the movable rivet-supporting member, a main driving shaft provided with an eccentric, a main actuating lever pivotally mounted in the frame and operatively connected with such eccentric and with the reciprocating plunger; an auxiliary operating lever operatively connected with the main drive shaft, and a pivoted reciprocating rivet-feeding member, for feeding rivets into position to be engaged by the slidable rivet-holding member and operatively connected with the auxiliary operating lever.

24. In a riveting machine, the combination of a frame having an upper jaw member and a lower jaw member, a movable rivet-holding member mounted upon one of said jaw members, a reciprocating plunger mounted upon the other of said jaw members, a cutting tool supported by said plunger and having a cutting edge movable into and out of engagement with a rivet supported by the movable rivet-supporting member, a main driving shaft provided with an eccentric, a main operating lever pivotally mounted in the frame and operatively connected with such eccentric and with the reciprocating plunger, an auxiliary operating lever operatively connected with the main drive shaft and with said movable rivet-holding member, for moving the latter into and out of position to engage a rivet to be operated upon, a pivoted rivet-feeding arm for feeding rivets successively into position to be engaged by such movable rivet-holding member, and means for operatively connecting the pivoted rivet-feeding arm with the mechanism for actuating said movable rivet-holding member.

25. In a riveting machine, the combination of a frame having an upper jaw member and a lower jaw member, a movable rivet-supporting member mounted upon one of said jaw members, a reciprocating plunger mounted upon the other of said jaw members, a cutting tool supported by said plunger and having a cutting edge movable into and out of engagement with a rivet supported by the movable rivet-supporting member, a main driving shaft provided with an eccentric, a main operating lever pivotally mounted in the frame and operatively connected with such eccentric and with the reciprocating plunger, an auxiliary operating lever operatively connected with the main drive shaft and with said movable rivet-supporting member, for moving the latter into and out of position to support a rivet in position to be operated upon, a pivoted reciprocating rivet-feeding member for feeding rivets successively into position to be supported by said movable rivet-supporting member, and an operating lever operatively connected with said pivoted reciprocating rivet-feeding member and with said auxiliary lever.

26. In a riveting machine, the combination of a frame having an upper jaw member and a lower jaw member, a movable rivet-supporting member mounted upon one of said jaw members, a reciprocating plunger mounted upon the other of said jaw members, a cutting tool supported by said plunger and having a cutting edge movable into and out of engagement with a rivet supported by the movable rivet-supporting member, a main driving shaft provided with an eccentric, a main operating lever pivotally mounted in the frame and operatively connected with such eccentric and with the reciprocating plunger, an auxiliary operating lever operatively connected with the main drive shaft and with said movable rivet-supporting member, for moving the latter into and out of position to support a rivet in position to be operated upon, a pivoted reciprocating rivet-feeding member for feeding rivets successively into position to be supported by said movable rivet-supporting member, an operating lever operatively connected with said pivoted reciprocating rivet-feeding member and with said auxiliary lever, a driving wheel adapted to be connected with a suitable source of power, and clutch mechanism operatively connected with the main driving shaft and movable into and out of position to operatively connect the drive shaft with such driving wheel.

27. In a riveting machine, the combination of rivet head engaging means for holding a rivet in position to be operated upon, a cutter provided with a cutting edge movable into and out of cutting engagement with the rivet stem, for splitting the same, and having inclined converging surface portions on opposite sides of the cutting edge, for spreading the split portions of the rivet stem, said cutting tool having rivet-bending surface portions extending outward at an angle with respect to said converging inclined surfaces, for bending the split portions of the rivet backward toward the head, and rivet-bracing means adapted to engage the body of the rivet, for bracing the same during the operation of splitting and bending the rivet.

28. In a riveting machine, the combination of means for holding a rivet in position to penetrate the material to be riveted, a cutting tool movable into and out of engagement with the stem of the rivet to split the same, said cutting tool being provided with means adapted to spread apart the split portions of the rivet, means for bending said spit portions of the rivet stem backward toward the rivet head and into clenching engagement with the material to be riveted, means for operating the cutting tool, and rivet bracing means movable with said cutting tool and adapted to engage the body of the rivet, for bracing the same during the operation of splitting and bending the rivet.

29. In a riveting machine, the combination of a main frame provided with means for rigidly holding a rivet in position to be operated upon, a cutting tool provided with a cutting edge movable into and out of cutting engagement with a rivet to be split, a plunger upon which the cutting tool is supported, a rotary main actuating shaft provided with an eccentric, and a main operating lever having a lever arm operatively connected with the eccentric, and having a transverse pivot portion extending through the frame, said lever having forked arm portions located on opposite sides of the portion of the frame through which such pivot portion extends and operatively connected with the plunger, one of said forked arm portions being integral with the transverse pivot portion of the lever.

30. In a riveting machine, the combination of a main frame provided with means for holding a rivet in position to be operated upon, a cutting tool provided with a cutting edge movable into and out of cutting engagement with a rivet to be split, a reciprocating plunger upon which the cutting tool is supported, a rotary main actuating shaft provided with an eccentric, a main operating lever having a slotted lever arm, a sliding bearing block slidably mounted in the slotted portion of said lever arm and encircling the eccentric upon the main shaft, a transverse pivot extending through the frame and forming a pivotal support for the lever, and means for operatively connecting the forked arm portions of the lever with the plunger.

In testimony, that I claim the foregoing as my invention I affix my signature in the presence of two witnesses, this 13th day of October, A. D. 1913.

ANDRU LARSEN.

Witnesses:
EUGENE C. WANN,
HARRY IRWIN CROWSER.

Copies of this patent may be obtained for five cents each, by addressing the "Commissioner of Patents Washington, D. C."